Feb. 14, 1950     J. I. DETWEILER     2,497,441
HYDRAULIC COUPLING
Filed March 19, 1945     2 Sheets-Sheet 1
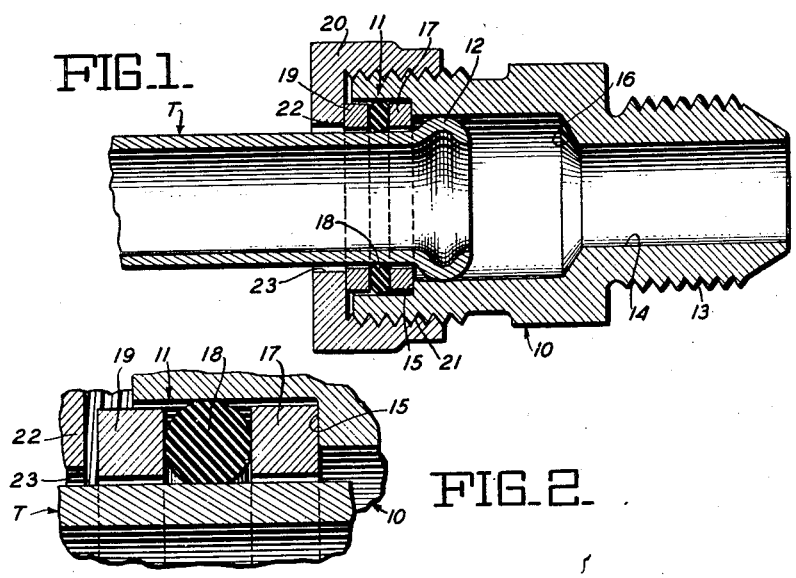
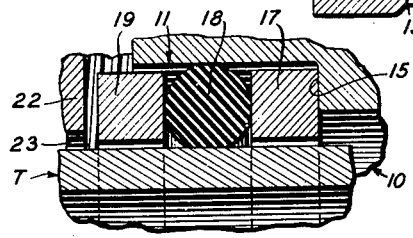
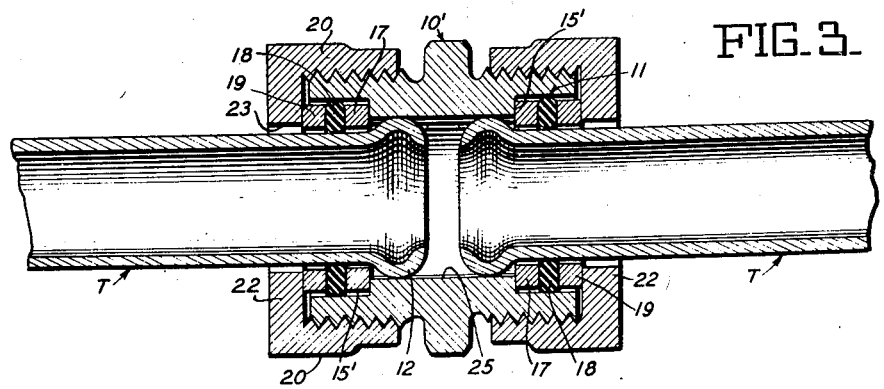
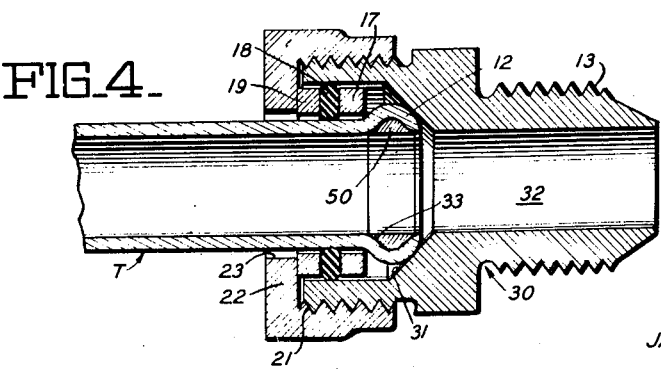
INVENTOR:
JAMES I. DETWEILER,
BY
George C. Sullivan
AGENT Feb. 14, 1950 J. I. DETWEILER 2,497,441
HYDRAULIC COUPLING
Filed March 19, 1945 2 Sheets-Sheet 2
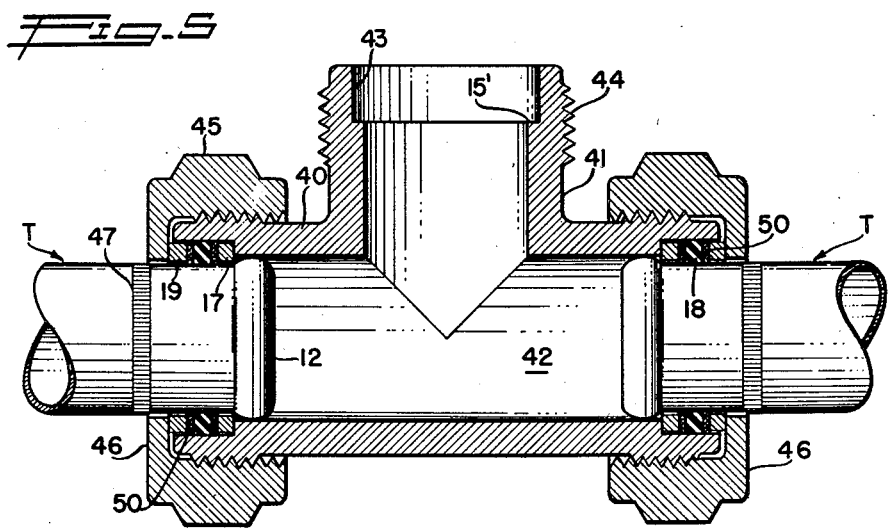
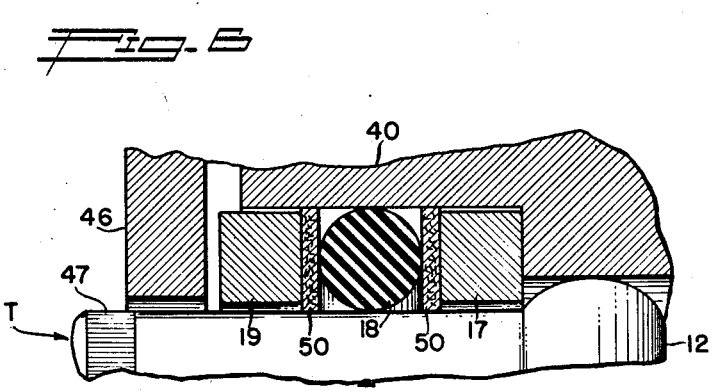
INVENTOR.
JAMES I. DETWEILER
BY
Agent Patented Feb. 14, 1950

2,497,441

UNITED STATES PATENT OFFICE 2,497,441

HYDRAULIC COUPLING

James I. Detweiler, Burbank, Calif., assignor to Lockheed Aircraft Corporation, Burbank, Calif.

Application March 19, 1945, Serial No. 583,405

1 Claim. (Cl. 285—90)

This invention relates to couplings and has particular reference to couplings and fittings for use with the pipes or tubing of hydraulic lines, and the like. This application is a continuation-in-part of my application, Serial No. 538,049, filed May 30, 1944, which became abandoned on April 29, 1945.

Relatively thin walled tubing having a substantial degree of flexibility and formed of aluminum alloy, copper, brass and other metals is used extensively in the hydraulic lines and pneumatic lines of aircraft and in other installations where fluids are handled under pressure. Owing to the highly stressed conditions, the relative thinness of the tubing walls, and other factors, it is impractical to cut threads in the tubing, and as a general rule, threadless couplings are employed in such installations. Where the fluid is under high pressure, the conventional packing gland type of couplings are not satisfactory because the pressure blows the tubing out of the fittings or couplings. Couplings, unions, and other fittings, have been introduced for use with tubing having flares or beads at its ends for strengthening the tubing and for preventing the tubing from blowing out of the fittings. In this latter type of coupling, the tubing is tightly and immovably confined usually by metal to metal contact between the tubing and coupling parts. In aircraft installations and in many other instances, the assembly is subjected to vibration tending to cause movement of the tubing relative to the coupling. Where the tubing is rigidly confined in the coupling, this vibration sets up concentrated stresses and causes crystallization of the tubing metal at or adjacent the bead, and the tubing is subject to premature failure.

In situations where the fittings are subjected to vibration and handle fluid under high pressures, for example, pressures in the neighborhood of 3,000 pounds per square inch, leaks soon develop. This leakage results from extrusion of the sealing rings in a direction away from the beads. The extrusion of the sealing rings reduces the compression on the rings and the extruded portions of the sealing material are pinched off. The reduction in compression and the mutilation of the sealing rings is followed by leakage at the fittings.

An important object of the invention is to provide a practical and dependable coupling or fitting for hydraulic and pneumatic tubing wherein it is practically impossible for the tubing to blow out of the fitting irrespective of the magnitude of the pressure imposed on the fluid.

Another object of the invention is to provide a tubing coupling that is flexible to the extent that vibration is effectively absorbed or dampened. The coupling of the present invention avoids direct metal to metal contact between the tubing and coupling parts, and provision is made for limited relative movement between the tubing and fitting so that vibration is dampened and stress concentration at the tubing bead and crystallization of the tubing metal are eliminaed.

Another object of the invention is to provide a coupling of the character referred to that permits easy rapid installation and removal of the tubing, and of the sealing elements of the coupling. The couplings of the invention are constructed so that the tubing may be entered or advanced into one coupling to a position beyond its operative position to allow the opposite end of the tubing to be readily aligned with and then entered into the other coupling to bring the tubing to its final position in the line or installation. This freedom of longitudinal movement of the tubing also permits easy replacement of the tubing and sealing rings. Upon backing off the coupling nuts, the tubing is freed for axial movement and such movement releases an end of the tubing from its coupling, permitting removal of the entire length of tubing or allowing removal and replacement of the sealing rings as conditions may require.

Another object of the invention is to provide a coupling of the character mentioned that is operable to handle fluid under extremely high pressures without leakage. In the coupling of the invention, the tendency for the tubing to blow out of the coupling serves to actuate the packing, and fluid pressure acting on the packing ring assembly also actuates the packing with the result that the sealing pressure is proportionate to the fluid pressure and leakage is effectively prevented, even in installations where the fluid pressures are very high.

Another important object of the invention is to provide a fitting of the character above referred to wherein extrusion of the sealing ring is avoided or prevented even under most severe conditions of operation. The invention includes extrusion-preventing back-up rings at the sides of the sealing ring which serve to avoid extrusion of the material of the sealing ring when the fitting is handling fluid under extremely high pressures and is subject to substantial and prolonged vibration.

A further object of the invention is to provide a coupling of the class referred to which has an uninterrupted fluid passage of uniform cross sectional configuration and fluid capacity throughout its length to assure unrestricted streamlined flow of the fluid.

Other objects and features of the invention will become apparent from the following detailed description of typical preferred forms of the invention wherein reference will be made to the accompanying drawings, in which:

Figure 1 is a longitudinal detailed sectional view of a fully assembled coupling;

Figure 2 is an enlarged fragmentary longitudinal section of the coupling illustrated in Figure 1 showing the sealing assembly prior to actuation;

Figure 3 is a view similar to Figure 1 illustrating another form of the invention;

Figure 4 is a view similar to Figure 1 showing still another embodiment of the invention;

Figure 5 is a longitudinal sectional view of a T fitting embodying still another form of the invention; and Figure 6 is an enlarged fragmentary longitudinal section of one of the packing assemblies illustrated in Figure 5.

The present invention is capable of embodiment in fittings and couplings for use in various classes of installations and may be modified to adapt it for given applications. It is contemplated that the fittings of the invention may be used in association with tubing, pipe, hose and other fluid handling members. I will herein describe the typical forms of the invention illustrated in the accompanying drawings, it being understood that the invention is not to be construed as limited or restricted to the particular details disclosed or the specific embodiments illustrated.

The tubing and coupling assembly of Figures 1 and 2 may be said to comprise generally a tubing T, a fitting or coupling body 10 receiving an end portion of the tubing, and means 11 in the body 10 for sealing or packing about the tubing.

The tubing T may be of any selected or required material such as aluminum alloy, brass, copper, steel, etc. In many installations where the couplings of the invention are useful, the tubing T may be relatively soft or bendable; for example, it may be formed of an aluminum alloy in the soft condition. In accordance with the invention, a flare or bead 12 is provided on the end portion of the tubing. The configuration of the bead 12 may be varied in different applications of the invention. In the case illustrated, the bead 12 is arcuate in cross section to present a curved convex external surface. The bead 12 is annular or continuous and is preferably provided at the extremity of the tubing T. As will be later described, the tubing T may be supplied in the plain or unflared condition and in a soft state and then flared and hardened subsequent to installation of the sealing or packing means parts.

The body 10 of the fitting or coupling may be varied greatly in design, construction and proportions to adapt the coupling for installation in different parts of hydraulic systems and other fluid handling apparatus. In Figure 1 the body 10 is in the nature of an adapter having an external screw thread 13 formed on one end portion to cooperate with a thread in a companion coupling or other part of the system. The opposite end portion of the body 10 is formed to receive the tubing T and the sealing means 11. In practice the body 10 may be an integral tubular member of substantial wall thickness to adequately carry screw threads. The intermediate portion of the body 10 may be thickened and made polygonal for engagement by wrenches, or the like. That portion of the body opening 14 which receives the tubing T and sealing ring assembly is stepped or graduated in diameter. The end part of the opening 14 contains the packing ring assembly and terminates at an annular radial shoulder 15 facing toward the adjacent end of the body. The shoulder 15 preferably lies in a plane normal to the longitudinal axis of the body opening 14. A second annular shoulder 16 is provided on the wall of the opening 14. It is a feature of the invention that the shoulder 16 may be spaced a substantial distance inwardly from the shoulder 15. The tubing bead 12 is received in the portion of the opening 14 occurring between the shoulders 15 and 16 and the shoulder 16 is engageable by the bead to limit the inward travel of the tubing T. The bead 12 is received in the opening 14 with some clearance. From the above it will be seen that the body 10 may be a simple, inexpensive one-piece part.

The packing or sealing means 11 comprises an assembly of rings surrounding the tubing T in front of the shoulder 15. A ring 17 of steel, aluminum or other selected material, is arranged against the shoulder 15, a sealing ring 18 of rubber or synthetic rubber-like material is positioned in front of the ring 17 and a ring 19 of steel, aluminum, or the like, is provided in front of the ring 18. The two metal rings 17 and 19 may be identical to reduce the cost of manufacture and to simplify the assembling of the coupling. The rings 17 and 19 are preferably square or rectangular in cross section to present end faces which are normal to the longitudinal axis of the coupling. The external diameter of the rings 17 and 19 is such that the rings have substantial clearance with the wall of the body opening 14. The internal diameter of the rings 17 and 19 is somewhat greater than the external diameter of the tubing T to provide or leave substantial clearance between the surface of the tubing and the rings. This clearance is illustrated in Figures 1 and 2 and prevents direct metal to metal contact between the rings and the tubing T.

The flexible resilient sealing ring 18 is preferably cylindrical in cross section as formed or initially installed although the invention also contemplates the employment of a sealing ring of rectangular cross section. It will be usually preferred to form the ring 18 of a synthetic rubber-like material that is unaffected by the fluids to be handled and that retains its characteristics of flexibility and resiliency throughout a wide range of temperatures. The sealing ring 18 is a one-piece continuous or unsplit member to assure uninterrupted sealing engagement with the tubing T and the wall of the opening 14. It is preferred to make the ring 18 sufficiently yielding or flexible to be easily sprung over the beaded end of the tubing T to a position between the rings 17 and 19. The ring 18 is preferably proportioned to have an initial cross sectional radius greater than the radial dimension of the space which it occupies to be under an initial radial compression when installed. This provides for limited areas of sealing contact for the sealing ring prior to the application of the mechanical pressure and fluid pressure. As illustrated in the drawings, the sealing ring is housed or confined in the annular space between the two metal rings 17 and 19. This space is square or rectangular in cross section. The parts are related and proportioned so that the outer metal ring 19 protrudes beyond the adjacent end of the body 10 when the three rings are in their assembled positions.

The sealing means 11 further includes a sleeve or nut 20 for maintaining the sealing ring assembly in the condition where the compressible ring 18 is effective in sealing between the body 10 and the tubing T. The nut 20 further serves to positively prevent the displacement or blowing-out of the tubing T and sealing ring assembly under the influence of high fluid pressures. The nut 20 is a tubular element surrounding the end portion of the body 10 and mating screw threads 21 are provided on the interior of the nut and the exterior of the body to operatively connect the nut with the body. An inturned annular lip or flange 22 is provided on the nut 20 to cooperate with the projecting ring 19. The flange 22 may have flat engagement with the end face of the ring 19. It will be seen that upon threading the nut 20 inwardly along the body 10 the flange 22 engaging the ring 19 compresses the packing ring assembly so that the sealing ring 18 is displaced or expanded radially to seal with the surface of the tubing T and the wall of the body opening 14. The shoulder 15 forms an abutment for the sealing ring assembly and upon inward threading of the nut 20 the rubber-like sealing ring 18 is compressed between the opposing surfaces of the spaced metal rings 17 and 19. In practice it is unnecessary to subject the sealing ring 18 of cylindrical cross section to substantial mechanical pressure, it being a special characteristic of a sealing ring of this configuration that fluid pressure alone is effective in actuating it to provide a dependable fluid-tight seal. The central opening 23 in the nut flange 22 passes or receives the tubing T with substantial clearance so that there is no metal to metal contact between the nut and the tubing. It will be observed in Figure 1 that the tubing T passes freely through the flange 22 and the rings 17 and 19 without contacting the same, and it will be further noted that the sealing ring 18 is the only element contacting the tubing. This gives the coupling the desirable flexibility and vibration absorbing action. The compressed sealing ring 18 engaged between the surface of the tubing T and the wall of the body opening 14 forms an annular fulcrum about which there may be limited relative angular movement of the coupling and the tubing. In this connection it will be observed that the convex flare or bead 12, having clearance with the wall of the opening 14, does not interfere with relative angular movement between the tubing and the body 10.

In assembling the coupling, the tubing T may be supplied or initially provided in the unflared state. In the case of aluminum or aluminum alloy tubing, the tubing is preferably supplied in the soft condition for ready bending and beading. The nuts 20 and rings 17 and 19 are slipped onto the end portions of the tubing before the beads 12 are formed. The beads 12 may be readily formed by die devices or by a spinning operation when the tubing is in the soft condition. Subsequent to the forming of the beads 12 on the opposite ends of the tubing T, the tubing may be hardened. The flexible sealing rings 18 are then sprung over the ends of the tubing and the outer rings 19 to their positions between the rings 17 and 19. An end portion of the tubing T is then entered in an opening 14 of one of the couplings and advanced until its bead 12 is at or adjacent the shoulder 16. This advancement of the tubing T allows the opposite end portion of the tubing to be brought into alignment with the opening 14 of the other coupling and then entered into the body of said other coupling. Thus the tubing T may be easily assembled between spaced fixed couplings of the system or apparatus. Referring now to a single coupling, the rings 17, 18 and 19 are moved into the coupling and the nut 20 is threaded onto the body 10. The nut is advanced to subject the sealing ring 18 to a desired compression. This completes the assembling of the coupling.

In the operation of the coupling the mechanical compression of the sealing ring 18 maintains the ring in effective sealing contact with the tubing T and the wall of the body opening 14. Fluid pressure acting on the end of the tubing T tends to move the tubing axially out of the coupling. This tendency is resisted by the engagement of the bead 12 with the inner ring 17 and the fluid pressure imposed on the tubing is transmitted to the sealing ring 18 to further compress it. Furthermore, the fluid pressure acting on the inner ring 17 and acting directly on the sealing ring 18 aids in actuating the sealing ring. This further compression of the sealing ring 18 by the fluid pressure acting on the tubing T and the ring assembly increases the efficiency of the fluid seal. Accordingly, the effectiveness of the fluid seal is substantially proportional to the pressure imposed on the fluid being handled. The engagement of the bead 12 with the inner metal ring 17 positively prevents the tubing from being blown out of the coupling by high fluid pressures. As described above, the only element of the coupling assembly which has direct contact with the tubing T is the annular sealing ring 18. This solitary annular engagement permits limited angular movement between the tubing and the coupling, giving the connection considerable flexibility and providing for the absorption of vibration. If it becomes necessary to replace the length of tubing T or the sealing rings 18, the nuts 20 of the couplings at the ends of the tubing are backed off and the tubing is moved longitudinally to a position where one of its ends may be withdrawn from the related coupling. Where a sealing ring 18 is to be replaced, the worn ring is merely expanded and withdrawn from the tubing and the replacement ring is sprung over the end of the tubing to its position between the two metal rings 17 and 19. The replacement tubing T or the original tubing with the new sealing rings 18 is easily installed between the spaced couplings in the manner described above without the necessity of removing or disturbing the couplings.

Figure 3 illustrates a union type coupling or straight coupling for connecting the adjacent ends of two lengths of tubing T. The tubing T may be the same as described above, being provided at its ends with external convexly curved beads 12. The coupling body 10' has a straight bore or opening 25 enlarged in diameter at its opposite end portions to have annular shoulders 15'. The shoulders 15' are spaced from and face toward the adjacent ends of the body. An assembly of a pair of metal rings 17 and 19 and sealing ring 18 is arranged in each end portion of the body 10' to have its inner ring 17 engage the shoulder 15'. The rings 17, 18 and 19 may be the same as the corresponding elements described above. Sleeves or nuts 20 are threaded on the opposite end portions of the body 10' and have inturned flanges 22 for cooperating with the projecting rings 19. The action of the sealing ring assemblies and the compressing nuts 20 is the same as in the coupling of Figures 1 and 2. It is preferred to proportion the body 10' so that the opposing ends of the two lengths of tubing T are spaced apart to insure independent flexibility or movement of the tubing. I have shown the ends of the two lengths of tubing T in spaced relatively close relation, it being understood that the spacing of the tubing may be sufficient to allow a retraction of the tubing a distance great enough to permit the ready removal of a length of tubing for the replacement of its sealing rings 18 or replacement of the entire tubing and ring assembly. In any case, the coupling body 10' may be slid back along one length of tubing to allow ready removal and insertion of the other tubing. The couplings of Figures 1 and 3 are merely typical of the many different forms of couplings that may embody the features of the invention.

Figure 4 illustrates an embodiment of the invention in which the body 30 has a single internal seat or shoulder 31. The body 30 may be similar in design and construction to the above described body 10 or may be of any other selected configuration. The tube receiving portion of the body opening 32 is enlarged in diameter and the enlarged portion of the opening terminates at the shoulder 31. The shoulder 31 slopes or tapers inwardly. The tubing T may be the same as described above except that in this case it may be desired to install a filler ring 50 within the bead 12. When the bead 12 is formed as by dies or a spinning operation an annular recess or groove 33 is left within the tubing T. The filler ring 50 is intended to fill this groove. The filler ring 50 may completely occupy the groove 33 and its internal surface may be cylindrical and flush with the internal surface of the tubing T to provide a uniform diametered or streamlined passage through the tubing. The filler ring 50 may be formed of steel, aluminum, or other metal, to strengthen or reinforce the tubing T and the bead.

In this form of the invention the tubing T is entered into the body 30 so that its bead 12 is at or adjacent the seat 31. The convex surface of the bead 12 may cooperate with the tapered seat to allow the desirable flexibility or relative angular movement of the tubing and body. It will be observed that when the bead 12 is at the seat 31 the fluid passage through the tubing and coupling assembly is uniform in diameter throughout.

The sealing means of Figure 4 may be the same as described above the corresponding reference numerals are applied to corresponding parts. The three rings 17, 18 and 19 of the assembly are engaged in the enlarged forward portion of the body opening 32. The inner ring 17 is engageable by the bead 12 to limit outward movement of the tubing T. The outer ring 19 extends from the end of the body for engagement by the flange 22 of the nut 20 to provide for the mechanical compression of the sealing ring 18. The rings 17 and 19 and the flange 22 have substantial clearance with the tubing T as in the other forms of the invention. When the coupling is in operation, the sealing ring 18, compressed between the metal rings 17 and 19, is in effective sealing contact with the tubing T and the wall of the body opening 32. The fluid pressure acting on the end of the tubing T urges the tubing outwardly. The bead 12 engages the innermost ring 17 to transmit this pressure to the sealing ring 18 to further compress or actuate the sealing ring. Thus in actual operation the bead 12 may be spaced a distance from the seat 31 to give the coupling its full range of flexibility.

In Figure 5 I have illustrated a form of the invention embodying extrusion-preventing means. As a typical example of such an embodiment, the extrusion-preventing means is illustrated incorporated in the sealing means of a T-fitting. The T-fitting may be of substantially conventional configuration, having a pair of aligned oppositely extending arms 40 and an intermediate radially extending branch or arm 41. The arms 40 and 41 are preferably of like or identical internal diameter, and their passages 42 are preferably cylindrical and uniform in diameter. The end portion of each arm has a cylindrical bore or socket 43 terminating in a shoulder 15' which is normal to the longitudinal axis of the arm. The arms 40 and 41 are externally thickened and carry screw threads 44. Nuts 45 similar to the above described nuts 20 are threaded on the arms and have inwardly extending flanges or lips 46 for cooperating with the sealing ring assemblies.

The tubing T may be the same as in the preceeding forms of the invention, each length of the tubing being provided at its ends with beads 12. The passages 42 of the T-fitting are proportioned to freely receive the beads 12 to facilitate the assembling of the line or tubing system as described in detail above. A band 47 or similar indicating mark, may be painted, machined or otherwise provided on the exterior of each tube T to assist in positioning the tubing. The band 47 is located to be visible at the end of the related nut 45 when the tubing bead 12 is in its correct position adjacent the sealing ring assembly. In the event a tubing T is inserted an excessive distance into the fitting its band 47 will not be visible. To correctly locate the tubing it is merely moved outwardly until the band 47 appears at the nut.

The three sealing assemblies of Figures 5 and 6 may be identical and each includes an inner ring 17 of steel, or the like, a sealing ring 18 of rubber, rubber composition or synthetic rubber, and an outer ring 19 of steel or other rigid material. These elements may be the same as in the previously described forms of the invention. When the fitting is finally assembled, the rings 17, 18 and 19 are arranged in a recess 43 so that the inner ring 17 is engageable with the shoulder 15' and the outer ring 19 extends from the fitting for engagement by the flange 46 of the nut. This embodiment of the invention is characterized by extrusion-preventing rings 50 interposed between the sealing ring 18 and the end rings 17 and 19. The back-up rings 50 are constructed of a somewhat yielding and compressible material. In practice I have found it desirable to form the rings 50 of leather, it being understood that other similar materials may be employed. The leather of the rings 50 may be uncompressed, but I prefer to use leather that is precompressed and that has a hardness approximating 95 Shore Durometer hardness. It is preferred to make the back-up rings 50 continuous and without radial cuts, and to form the rings so that their sides are substantially parallel. The rings 50 are preferably arranged so that the hair side of the leather opposes and engages the sealing ring 18. I prefer to proportion the back-up rings 50 so that their external peripheries engage or have some interference with the wall of the socket 43 and their internal peripheries initially engage or closely approach the periphery of the tubing T. As illustrated in the drawing, the back-up rings 50 are rather thin, it being understood that in some applications of the invention somewhat thicker rings may be employed.

The tubing and T fitting are assembled substantially as in the other forms of the invention. The tubing T is brought to a position where its bead 12 is adjacent the inner ring 17 of the sealing assembly as indicated by the distinctive band 47. The passages 42 of the T fitting may be of sufficient length to allow axial movement of the tubing for the introduction of the opposite tubing end into the next fitting of the line or assembly. With the tubing T in position, the rings 17, 18, 19 and 50 are moved into the socket 43 and the nut 45 is threaded onto the fitting. The nut is advanced along the fitting arm to put the sealing ring 18 under the selected initial compression, if any.

In operation, when the assembly is subjected to internal fluid pressure, the tubing T tends to move axially out of the fitting. This is resisted by the tubing bead 12 engaging the inner ring 17 and the axial fluid pressures exerted on the tubing are transmitted to the sealing ring 18 to subject it to additional compression. Thus the effectiveness of the sealing ring is substantially proportional to the fluid pressure being handled. The mechanical and hydraulic axial pressures exerted on the sealing ring tend to force or extrude the material of the ring 18 between the surface of the tubing T and the end ring 19. There may also be some tendency for the material of the sealing ring to extrude past or into the inner ring 17. The mechanical and hydraulic axial pressures are transmitted through the back-up rings 50. Furthermore, fluid pressure itself acting directly on the sealing ring compresses the ring so that an effective seal is assured irrespective of movement of the tubing. This direct fluid pressure on the sealing ring is additive to the pressure exerted on the sealing ring by the nut 45 and tubing movement. The material of the rings 50 is compressed by these pressures and the rings are expanded or distorted radially inwardly and outwardly. This brings the material of the rings 50 into tight cooperation with the surface by the tubing T and the wall of the socket 43 to effectively prevent extrusion of the material of the sealing ring 18. The initial compression of the sealing ring assembly by the nut 45 assures sufficient initial interference between the rings 50 and the tubing T to prevent extrusion of the sealing ring at any time. The extrusion-preventing action of the rings 50 is maintained even during excessive and prolonged vibration of the assembly while handling high fluid pressures. Actual tests have demonstrated that the back-up rings dependably prevent extrusion of the sealing ring material under the most severe operating conditions and with the high pressures and vibration maintained for prolonged periods.

Having described only typical forms of the invention, I do not wish to be limited to the specific details herein set forth, but wish to reserve to myself any variations or modifications that may appear to those skilled in the art or fall within the scope of the following claim.

I claim:

A fitting for use with a tubing having an external end bead comprising a body having an opening for receiving the beaded end portion of the tubing with clearance, a shoulder on the wall of the opening facing toward the adjacent end of the body, an inner ring engaged against said shoulder and surrounding the tubing with substantial clearance, an outer ring in said opening surrounding the tubing with substantial clearance and projecting from said end of the body, a flexible resilient ring of substantially cylindrical transverse cross section between the inner and outer rings, and a nut having threaded engagement with the body and being operable to force the outer ring toward said shoulder to distort the flexible ring and in so doing force it into sealing engagement with the tubing and the wall of said opening, whereby the tubing is supported for limited angular movement out of contact with the fitting except in the zone of the flexible ring.

JAMES I. DETWEILER.

REFERENCES CITED

The following references are of record in the file of this patent:

UNITED STATES PATENTS

| Number | Name | Date |
| --- | --- | --- |
| 1,869,915 | Sample | Aug. 2, 1932 |
| 2,232,293 | Toennies | Feb. 18, 1941 |
| 2,300,584 | Martin | Nov. 3, 1942 |
| 2,354,538 | Parker | July 25, 1944 |
| 2,364,447 | Hynes | Dec. 5, 1944 |